(12) United States Patent
Dicken et al.

(10) Patent No.: US 11,913,890 B1
(45) Date of Patent: Feb. 27, 2024

(54) SCREENING SYSTEM

(71) Applicant: Halo X Ray Technologies Limited, Nottingham (GB)

(72) Inventors: Anthony Dicken, Nottingham (GB); Daniel Spence, Nottingham (GB)

(73) Assignee: Halo X Ray Technologies Limited, Nottingham (GB)

( * ) Notice: Subject to any disclaimer, the term of this patent is extended or adjusted under 35 U.S.C. 154(b) by 0 days.

(21) Appl. No.: 18/281,237

(22) PCT Filed: Jan. 6, 2022

(86) PCT No.: PCT/GB2022/050019
§ 371 (c)(1),
(2) Date: Sep. 8, 2023

(87) PCT Pub. No.: WO2022/214775
PCT Pub. Date: Oct. 13, 2022

(30) Foreign Application Priority Data

Apr. 6, 2021 (GB) .................................... 2104892

(51) Int. Cl.
*G01N 23/10* (2018.01)
*G01N 23/044* (2018.01)
*G01N 23/087* (2018.01)
*G01N 23/20* (2018.01)
*G01N 23/20008* (2018.01)
*G01N 23/20091* (2018.01)
(Continued)

(52) U.S. Cl.
CPC .......... *G01N 23/10* (2013.01); *G01N 23/044* (2018.02); *G01N 23/087* (2013.01);
(Continued)

(58) Field of Classification Search
None
See application file for complete search history.

(56) References Cited

U.S. PATENT DOCUMENTS

| 5,040,199 A | 8/1991 | Stein |
| 6,584,170 B2 * | 6/2003 | Aust ............... G01V 5/0016 378/57 |

(Continued)

FOREIGN PATENT DOCUMENTS

| CN | 203405584 U | 1/2014 |
| WO | WO-2006135586 A2 | 12/2006 |
| WO | WO-2007128224 A1 | 11/2007 |

OTHER PUBLICATIONS

Mahmood, Iskandar A. et al., "Spiral-Scan Atomic Force Microscopy: A Constant Linear Velocity Approach," Proceedings of 10th IEEE International Conference on Nanotechnology Joint Symposium, Ilsan, Korea, Aug. 17-20, 2010, pp. 115-120. doi: 10.1109/NANO.2010.5698063.

(Continued)

*Primary Examiner* — Thomas R Artman
(74) *Attorney, Agent, or Firm* — Bradley Arant Boult Cummings LLP

(57) ABSTRACT

There is presented a screening system and a corresponding method for screening an item. The screening system includes a detection apparatus (100), a rotatable platform (310) to receive the item, and a mechanical arrangement (320, 330). The detection apparatus has an emitter portion to generate a primary beam of ionising radiation and a detector portion to detect an absorption signal and at least one of a diffraction signal and a scattering signal. The mechanical arrangement is adapted to translate the detection apparatus along a translation axis to scan the item with the primary beam. The screening system may be used for identifying restricted or illicit substances that may be present in some luggage or in mail.

18 Claims, 5 Drawing Sheets

(51) Int. Cl.
*G01N 23/205* (2018.01)
*G01N 23/2055* (2018.01)

(52) U.S. Cl.
CPC . *G01N 23/20008* (2013.01); *G01N 23/20083* (2013.01); *G01N 23/20091* (2013.01); *G01N 23/205* (2013.01); *G01N 23/2055* (2013.01); *G01N 2223/045* (2013.01); *G01N 2223/0561* (2013.01); *G01N 2223/0563* (2013.01); *G01N 2223/0566* (2013.01); *G01N 2223/1016* (2013.01); *G01N 2223/316* (2013.01); *G01N 2223/3306* (2013.01); *G01N 2223/401* (2013.01); *G01N 2223/402* (2013.01); *G01N 2223/403* (2013.01); *G01N 2223/41* (2013.01); *G01N 2223/419* (2013.01); *G01N 2223/421* (2013.01); *G01N 2223/423* (2013.01); *G01N 2223/639* (2013.01)

(56) References Cited

U.S. PATENT DOCUMENTS

| | | | |
|---|---|---|---|
| 7,356,115 B2 * | 4/2008 | Ford | G01V 5/005 378/57 |
| 9,921,173 B2 * | 3/2018 | Evans | G01N 23/20083 |
| 10,481,111 B2 * | 11/2019 | Hench | G01N 23/083 |
| 10,948,432 B2 * | 3/2021 | Evans | G01N 23/205 |
| 11,703,466 B2 | 7/2023 | Dicken | |
| 2003/0031293 A1 | 2/2003 | Aust et al. | |
| 2004/0109532 A1 | 6/2004 | Ford et al. | |
| 2009/0168958 A1 | 7/2009 | Cozzini et al. | |
| 2015/0362443 A1 * | 12/2015 | Evans | G01N 23/20083 378/4 |
| 2016/0223706 A1 | 8/2016 | Franco et al. | |
| 2018/0113084 A1 | 4/2018 | Hench et al. | |
| 2020/0057010 A1 * | 2/2020 | Evans | G01N 23/205 |
| 2022/0381710 A1 * | 12/2022 | Evans | G01N 23/20 |
| 2023/0118850 A1 * | 4/2023 | Dicken | G01N 23/10 378/87 |

OTHER PUBLICATIONS

Patent Cooperation Treaty, International Application No. PCT/GB2022/050019, "International Search Report," dated Apr. 12, 2022, 2 page.

* cited by examiner

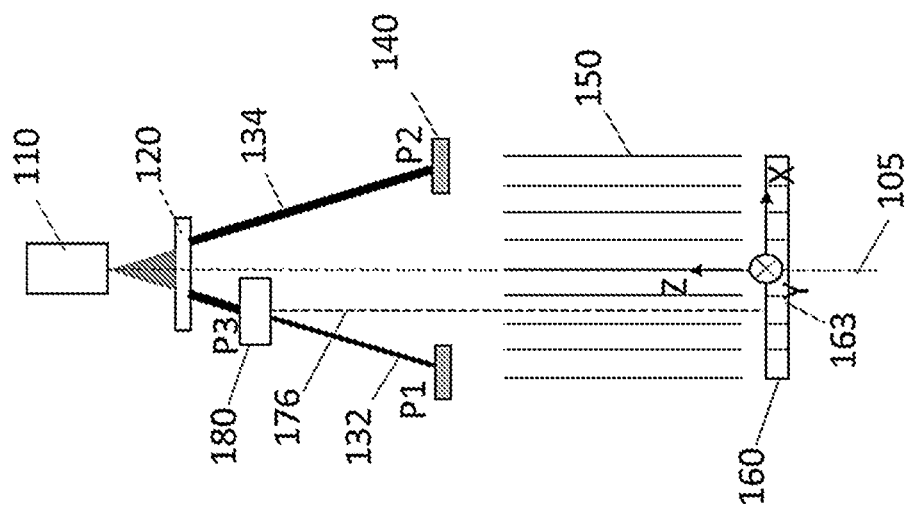
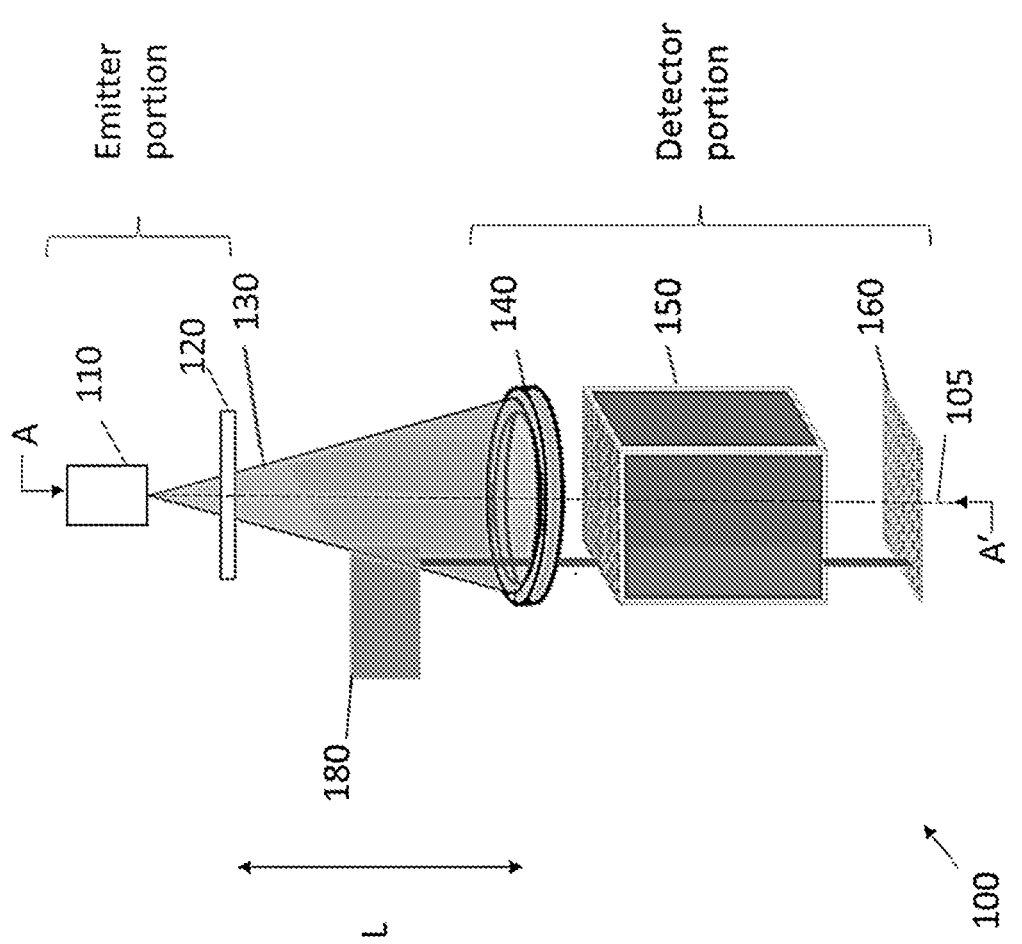
Figure 1B
Figure 1A

SCREENING SYSTEM

FIELD OF THE DISCLOSURE

The disclosure relates to a screening system. In particular the disclosure relates to a screening system for identifying restricted or illicit substances that may be present in various items including in some luggage or in mail.

BACKGROUND

Various restricted areas, such as airports, sensitive facilities of national infrastructure and some public spaces often require a screening system. Traditional X-ray-absorption security screening systems are an effective tool for automatically identifying threats and other contraband that may be present in some luggage. However, the high detection rate of these systems often leads to a high false alarm rate, in which benign items are wrongly labelled as a threat. This results in additional security screening measures, increased touchpoints between security staff and passenger luggage to resolve the alarm and subsequent increased waiting times.

To reduce instances of false alarm, some screening systems may implement a first stage in the form of an X-ray absorption pre-screener, and a second stage that uses scattering/diffraction information to confirm or overturn an alarm signal generated by the first stage. Such systems are relatively complex and increase the overall scanning time.

It is an object of the disclosure to address one or more of the above-mentioned limitations.

SUMMARY

According to a first aspect of the disclosure, there is provided a screening system for screening an item, the screening system comprising a detection apparatus comprising an emitter portion to generate a primary beam of ionising radiation and a detector portion to detect an absorption signal and at least one of a diffraction signal and a scattering signal; the screening system further comprising a rotatable platform adapted to receive the item; and a mechanical arrangement adapted to translate the detection apparatus along a translation axis to scan the item with the primary beam.

For instance, the item may be some luggage containing various articles. It may also be a letter or a parcel.

Optionally, wherein the translation axis is substantially parallel to a surface of the rotatable platform.

Optionally, upon rotation of the rotatable platform and translation of the detection apparatus, the detection apparatus collects data along a curved trajectory in a reference frame of the rotational platform.

For instance, the curved trajectory may form a two-dimensional spiral.

Optionally, the rotatable platform is rotatable around a rotational axis and wherein the translation axis is substantially perpendicular to the rotational axis and intersects with the rotational axis.

For instance, the rotational axis may be located at the geometric centre of the platform.

Optionally, the emitter portion comprises a source of ionizing radiation and a beam former adapted to generate the primary beam of ionizing radiation.

For instance, the source of ionizing radiation may be an X-ray source such as an X-ray point source.

Optionally, the source of ionizing radiation is a polychromatic source.

Optionally, the detector portion comprises an absorption sensor, an energy resolving detector and a collimator, the collimator comprising a plurality of channels, each channel being adapted to receive diffracted or scattered radiation.

For instance, the absorption sensor may be an X-ray absorption detector such as a dual-energy ring detector. The absorption sensor may be provided before the collimator, or between the collimator and the energy resolving detector or after the energy resolving detector.

Optionally, the primary beam has a characteristic propagation axis associated with it, and wherein the collimator is provided along the characteristic propagation axis of the primary beam.

Optionally, the energy resolving detector is spatially resolved. For instance, the energy resolving detector may be a pixelated energy resolving detector.

Optionally, the primary beam is a conical shell beam of ionising radiation.

Optionally, the screening system comprises a processor configured to receive a first data set from the detection apparatus to form a first image and a second data set from the detection apparatus to form a second image, wherein the first and second images overlap spatially.

Optionally, the first image is an absorption image and the second image is a diffraction or a scattering image of the item.

Optionally, the energy resolving detector is a pixelated energy resolving detector and the processor is configured to process the second data set to correct for the angular dependence of each pixel of the energy resolving detector.

Optionally, the absorption sensor comprises a plurality of absorption detector elements and the processor is configured to process the first data set to correct for the angular dependence of each absorption detector element.

For instance, the processor may be configured to apply an orientation correction factor.

Optionally, the processor is configured to execute a reconstruction algorithm to obtain a plurality of absorption images from different depth planes, to select an absorption image from one plane and to overlay the selected absorption image with a corresponding diffraction or scattering image from the same plane.

For example, the reconstruction algorithm may be a tomosynthesis reconstruction algorithm.

Optionally, the processor is configured to perform image segmentation of at least one of the first image and the second image to identify one or more regions of interest and to perform image classification of the said one or more regions of interest.

For instance, the processor may be configured to execute a first algorithm to perform image segmentation and a second algorithm to perform image classification.

Optionally, the processor is configured to calculate a sample parameter based on the second set of data to identify the nature of a sample to be identified, wherein the sample parameter comprises a lattice spacing.

For instance, the sample may be an article present in the item or a portion of an article.

Optionally, the screening system comprises a controller adapted to control the motion of the detection apparatus and of the rotatable platform.

For instance, the mechanical arrangement may comprise at least one guide member, and the controller may be configured to translate the detection apparatus along the said at least one guide member.

For instance, the controller may be adapted to operate the screening system in a first mode in which the rotatable platform rotates with constant frequency and the detector apparatus is translated with a constant linear velocity, or in a second mode in which the angular velocity of the rotatable platform and the linear velocity of the detection apparatus are adjusted over time so that the velocity of the detection apparatus along the curved trajectory remains constant.

According to a second aspect of the disclosure, there is provided a method for screening an item, the method comprising providing a rotatable platform adapted to receive the item; providing a detection apparatus comprising an emitter portion to generate a primary beam of ionising radiation and a detector portion to detect an absorption signal and at least one of a diffraction and a scattering signal; rotating the rotatable platform and translating the detection apparatus along a translation axis to scan the item with the primary beam.

Optionally, the method comprises detecting the absorption signal and the said at least one of a diffraction signal and a scattering signal simultaneously.

The options described with respect to the first aspect of the disclosure are also common to the second aspect of the disclosure.

DETAILED DESCRIPTION

The disclosure is described in further detail below by way of example and with reference to the accompanying drawings, in which:

FIG. 1A is a diagram of a detection apparatus for measuring high energy absorption and diffraction or scattering signals;

FIG. 1B is a sectional view of the detection apparatus of FIG. 1A;

Figure 2B:
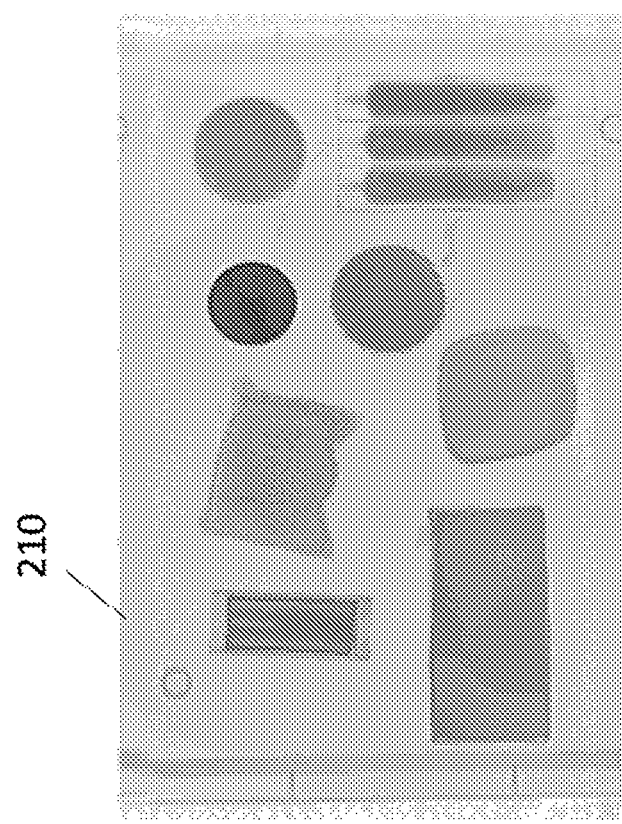
FIG. 2B is a colour coded scattering/diffraction image of the same test tray.

FIG. 1A is a diagram of a detection apparatus 100 for measuring both high energy absorption and high energy diffraction or scattering. The detection apparatus includes an emitter portion to generate a primary beam of ionising radiation and a detector portion to detect an absorption signal and at least one of a diffraction signal and a scattering signal. The primary beam 130 may also be referred to as probe or probe beam.

The emitter portion is formed of a source of ionizing radiations 110 such as a source of X-ray or gamma-ray radiations, and a mask or beam former 120. The source of ionizing radiation 110 is aligned with the mask 120 for forming the primary beam 130 of electromagnetic radiation.

The source of ionizing radiation 110 may be adapted to provide high-energy electromagnetic EM radiations. For example, the high-energy EM radiations may have photons of energy greater than about 1 keV. The high-energy EM radiations may be hard X-ray radiations having photons of energy greater than about 10 keV. For example, the source 110 may include an X-ray source for providing X-rays having an energy in the region of about 20 keV to about 200 keV. The source of ionizing radiation 110 may be a polychromatic source such as a polychromatic X-ray source.

The mask 120 may be formed by a solid body made of a radiopaque material provided with a shaped slit. Example of radiopaque materials that can block X-rays include tungsten or alloys made of steel and lead or from combinations of these materials. The mask 120 may be provided with an annular-shaped slit for forming a primary beam 130 having a conical shell profile and referred to as conical shell beam. Alternatively, the mask 120 may be designed to form a primary beam having other hollow beam shapes. In the present example the source is a polychromatic X-ray source and the primary beam a polychromatic annular X-ray beam.

The detector portion is formed of an ionizing radiation absorption sensor 140, a collimator 150 and an energy resolving detector 160 for detecting the energy of scattered or diffracted photons from a sample material.

The ionizing radiation absorption sensor 140 is provided on the propagation axis 105 at a distance L from the mask 120. In this example, the absorption sensor is provided between the mask 120 and the collimator, however in other embodiments the absorption sensor 140 may be provided between the collimator 150 and the energy resolving detector 160 or after the energy resolving detector 160. Therefore the sensor 140 may be placed at various location on the propagation axis 105, with its surface substantially parallel to the mask 120. The size of the absorption sensor may be selected depending on the chosen arrangement to catch the radiation from the primary beam. The absorption sensor 140 has a hollow shape. The absorption sensor 140 has a sensing area provided with a plurality of absorption detectors elements distributed along its lengths (not shown), and a hollow centre to let the scattering/diffracting photons travel towards the collimator 150. In this example the absorption sensor 140 is a ring X-ray absorption sensor. The space provided between the mask 120 and the absorption sensor 140 forms an inspection volume for receiving a sample material 180. A ring sensor facilitates a supplementary measurement of the number of rays absorbed by the sample material and does not impede the scattering/diffracting photons. Both scattering and absorption signals can be captured simultaneously.

The collimator 150, also referred to as grid structure, is provided on the propagation axis 105 between the absorption sensor 140 and the energy resolving detector 160. The collimator 150 may be positioned such that the input surface of the collimator is substantially normal to the propagation axis 105. The detector 160 is positioned such that its detection surface is substantially parallel to the output surface of the collimator 150. The collimator 150 is used to constrain the incidence of electromagnetic radiation onto the detector 160, which only collects data arising from a particular angle of scatter or diffraction. The collimator 150 is elongated and includes a plurality of channels extending between its input and its output. The channels may have a hexagonal cross section, or different shapes allowing the channels to be arranged in a tessellated fashion. The walls forming the channels may be formed from suitable material to block or substantially attenuate X-ray radiation, such as tungsten or lead antimony alloy.

The energy resolving detector 160 may be spatially resolving, such as a pixelated energy resolving X-ray detector. The energy resolving detector 160 and the absorption sensor 140 can be coupled to a data analyser to store and analyse the collected data.

It will be appreciated that various mechanical features (not shown) would be provided to hold the absorption sensor 140, the collimator 150 and the energy resolving detector 160 in relative position with each other. A housing may also be provided to enclose or partially enclose the elements of the detector portion. Similarly mechanical features would be provided to hold the source 110 and the mask 120. A housing may also be provided to enclose or partially enclose the elements of the emitter portion. A longitudinal member may also be provided to hold the emitter portion and the detector portion in a desired alignment with respect to each other.

In operation, the primary beam 130 produces a circular footprint on the plane of the absorption sensor 140. When a sample material 180 is placed within the inspection volume, the detector 160 measures the energy of the photons scattered by the sample material at known angles of scatter, and the absorption sensor 140 measures an absorption signal of the ionising radiation. The data collection from the absorption sensor 140 and from the energy resolving detector 160 may occur sequentially or simultaneously.

FIG. 1B illustrates a cross section of the apparatus 100 of FIG. 1A along a line A-A', when a diffracting sample material 180 is provided within the inspection volume. For instance, the diffracting sample material may be an object or portion of an object present in some luggage. The conical shell beam 130 is formed of a plurality of rays of electromagnetic radiation, also referred to as primary rays. The sample material 180 intersects the primary beam 130 at point P3. This produces a ray 176 of diffracted photons at a fixed diffraction angle. The ray 176 passes through the collimator 150 and is collected by the pixel 163 of the energy-resolving detector 160. The primary ray 132, having passed through the sample material 180, is measured at point P1 on the absorption sensor 140. Similarly, the unattenuated primary ray 134 is detected at point P2 on the sensor 140.

It will be appreciated that the system could also work with an amorphous sample producing a scattered ray at a fixed scattered angle.

The spatial distribution of the incident photons on the detector 160 provides the location of the diffracting sample 180. Stated another way, the three dimensional coordinates (x,y,z) of the sample 180 can be retrieved based on the location of the pixels measuring the signal. For instance, the three-dimensional coordinates may be defined with respect to an origin provided at the centre of the surface of the detector 160 as shown in FIG. 1B. The nature of the diffracting sample can be retrieved by calculating the d-spacing of the sample from the energy of the photons.

The angular/energy distribution of the scattered intensity is unique to each different crystal structure and thus can be used to identify a material and determine characteristics such as lattice dimensions, crystallite size and percentage crystallinity. The relationship between the lattice spacing (d), and the angle ($\theta$) subtended by the diffracted or scattered radiation from a plane of atoms inside a crystal is provided by the Bragg condition: $n\lambda=2d \sin \theta$, in which $\lambda$ is the wavelength of the incoming radiation and (n) is an integer. The angle subtended by the diffracted or scattered radiation and the interrogating or primary radiation is $2\theta$ (two theta). The two-theta angle is the angle between an incident X-ray beam and the diffracted X-ray. The two-theta angle at which scattered photons are collected by each collimator channel is determined by the angle subtended by the longitudinal axis of the collimator channel and the primary beam 130. The collimator 150 collects scattered flux propagating normal to the detection surface and therefore the opening angle of the primary beam determines the two-theta angle in this case.

FIG. 2 illustrates example images created by raster-scanning the apparatus of FIG. 1 over a test-tray filled with differing sample materials. Raster-scanning can be achieved by sweeping the primary beam along a sawtooth trajectory. If the tray is on a conveyor belt the probe continuously traverses the belt whilst the belt is incrementally moved.

Figure 2A:
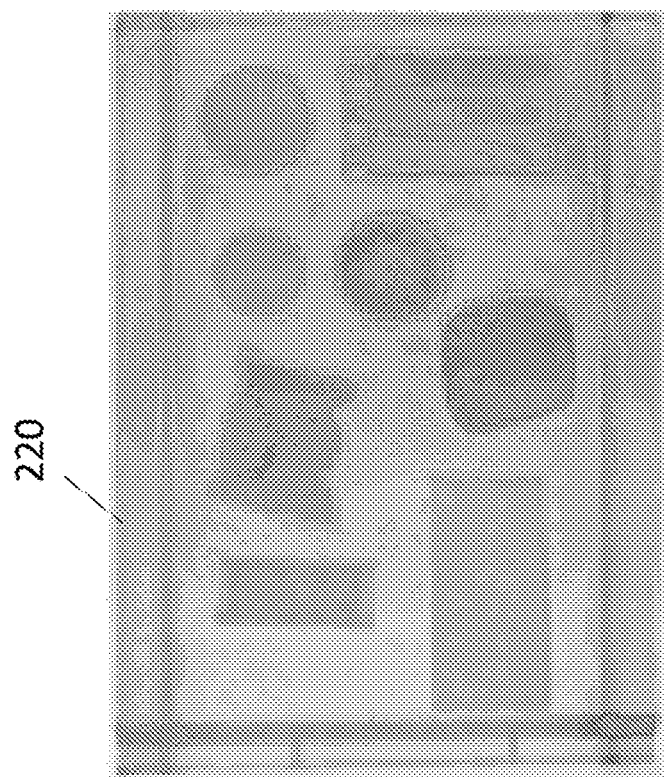
FIG. 2A is a dual-energy absorption image of a test tray filled with various sample materials.

In this example the absorption sensor 140 was a dual-energy absorption ring sensor and the detector 160 was a pixelated energy-resolving detector. FIG. 2A illustrates a dual-energy absorption image 210 of the test tray obtained from absorption data collected by the dual-energy absorption ring sensor. FIG. 2B shows a colour coded scattering/diffraction image 220 of the test tray obtained from scattering/diffraction data collected by the pixelated energy-resolving detector. In this example, the information collected by the absorption sensor and the energy-resolving detector was captured simultaneously and the images 210 and 220 spatially aligned. Stated another way the images are co-registered.

X-rays interact with matter through different processes that include pair production, photoelectric effect absorption, elastic (Rayleigh or Thomson) and inelastic (Compton) scattering processes. Absorption based techniques, such as dual-energy X-ray absorptiometry (DXA) techniques can be used to establish a material atomic number Z and electron density by measuring the attenuation of an X-ray beam transmitted through a sample at broadly two different X-ray energies. X-ray photons that have undergone the photoelectric effect or Compton scattering are measured by their absence in the detected signal. However, dual-energy X-ray techniques do not provide structural information (d-spacing) of the sample. X-ray diffraction can be used to identify the nature of a material having a degree of structural order, for instance a repeating pattern of atoms, with a high degree of accuracy. X-ray diffraction techniques such as X-ray crystallography, use an elastic scattering process such as Rayleigh scattering in which an outgoing X-ray has the same wavelength as an incoming X-ray. A diffraction pattern produced by the Rayleigh scattered radiation is used to determine the lattice structure of the matter of the sample under inspection via Bragg's Law.

Figure 3:
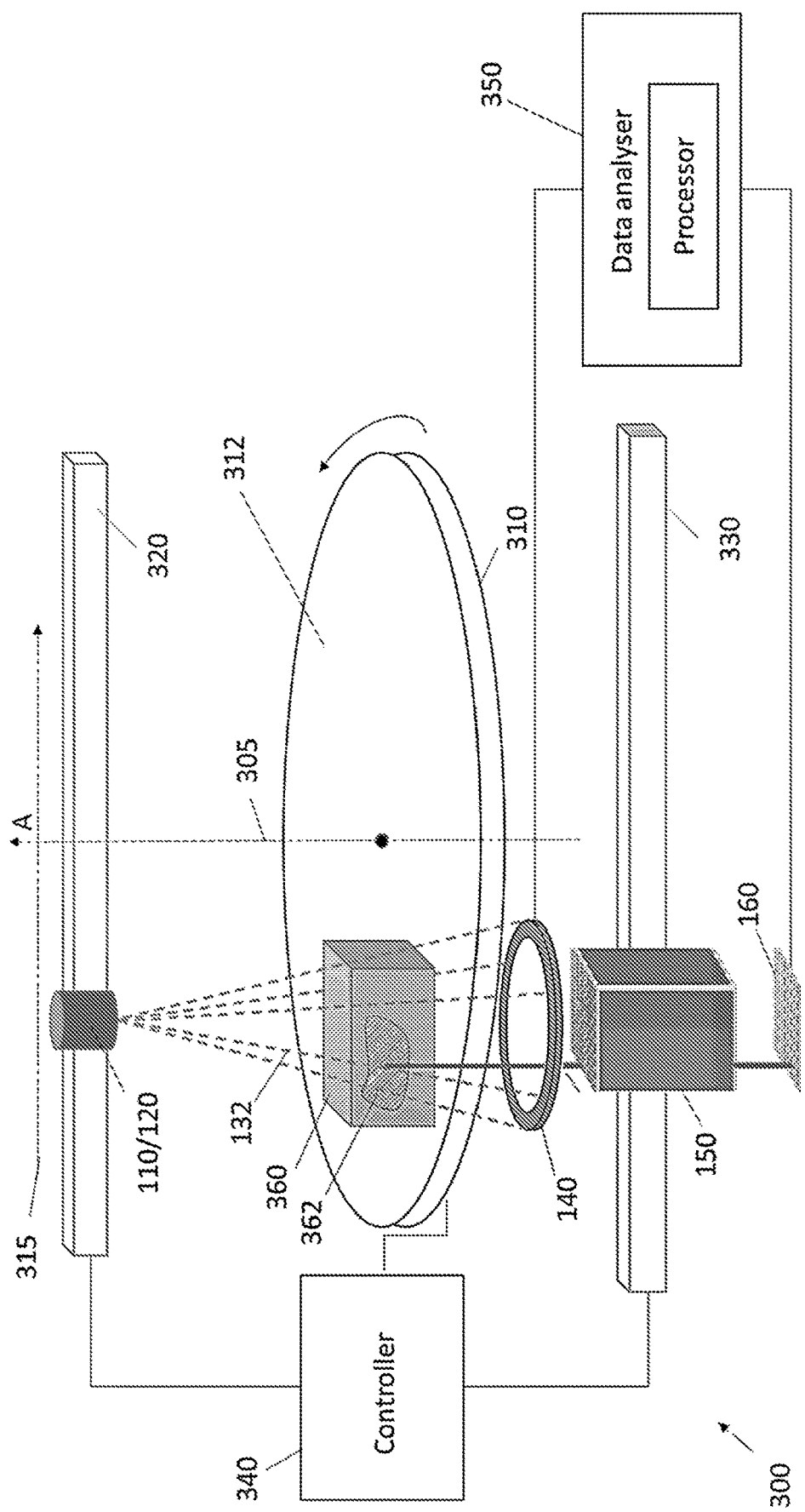
FIG. 3 is a diagram of a screening system using the apparatus of FIG. 1.

FIG. 3 illustrates a screening system. The screening system 300 includes a rotatable platform 310 to receive an item to be scanned, such as some luggage, and a detection apparatus 100 as described above in FIG. 1. The detection apparatus 100 has an emitter portion to generate a primary beam of ionising radiation and a detector portion to detect an absorption signal and at least one of a diffraction signal and a scattering signal. A mechanical arrangement 320 and 330 is provided to translate the apparatus 100 along a translation axis 315 to scan the item with the primary beam. A controller 340 is provided to control the motion of the detection apparatus 100 and of the rotatable platform 310. A data analyser 350 is provided to receive data from the detector portion of the apparatus 100 and perform data analysis.

As mentioned above in FIG. 1, the detection apparatus 100 may be implemented in different ways. For instance, the absorption sensor 140 may be provided on the propagation axis of the primary beam 130 before the collimator 150, or between the collimator 150 and the energy resolving detector 160 or after the energy resolving detector 160. The system 300 is not limited to any particular implementation of the detection apparatus 100.

The platform 310 should be made of a material that interacts weakly or not at all with the ionising radiation being used, such as X-ray radiations. For example, the platform 310 may be made of carbon fibre. The rotatable platform is rotatable around a rotational axis 305, provided at the geometric centre, also referred to as centroid of the platform 310. In this example the platform has a circular shape, however it will be appreciated that the platform may have a different geometrical shape. The translation axis 315 is substantially perpendicular to the rotational axis 305 and intersects with the rotational axis, illustrated as the virtual point A in FIG. 3. As a result, the translation axis 315 is substantially parallel to the surface 312 of the rotatable platform on which the item 360 is provided. By providing an arrangement in which the rotational axis 305 is provided at the geometric centre of the platform 310, and the translation axis 315 passing over the centre of the platform, a simple and reliable scanning system is obtained that limits the stress on the bearing of the system and facilitates the analysis of the data by using a relatively simple reference frame. However, it will be appreciated that the rotational axis 305 does not necessarily have to be at the geometric centre of the platform 310, nor does the translation axis 315 necessarily needs to pass over the centre of the platform, and that off axis/off centre geometries could be envisaged.

The mechanical arrangement can be implemented in various ways such that the emitter portion (110/120) and the detector portion (140, 150, 160) of the apparatus 100 move as one unit. In this example the mechanical arrangement includes two parallel guide members 320 and 330 for translating the emitter portion and the detector portion, respectively. The first guide member 320 is provided above the platform 310 while the second guide member 330 is provided below the platform 310. In an alternative embodiment a single guide member is used and the various parts of the apparatus 100 are held together by an arm coupled to the guide member.

In operation a user places an item 360 to be scanned on the platform 310. The controller then starts the scanning process by activating the detection apparatus and controlling the motion of the mechanical arrangement and the motion of the platform. The emitter portion generates the primary beam of ionising radiation and the detector portion detect an absorption signal and a diffraction/scattering signal. The platform 310 rotates with respect to the rotational axis 305 and the detection apparatus 100 is translated along the translation axis 315. Upon rotation of the rotatable platform and translation of the detector apparatus, the detector apparatus collects data along a curved trajectory in a reference frame of the rotational platform. For instance, the curved trajectory may be a two-dimensional spiral. The absorption sensor 140 and the energy resolving detector 160 may be operated to collect data simultaneously or sequentially. The controller 340 is configured to control the speed of rotation and the linear velocity of the translation motion of the detection apparatus. For instance, the controller 340 may be adapted to operate the screening system in a first mode in which the rotatable platform rotates with constant frequency and the detector apparatus is translated with a constant linear velocity, or in a second mode in which the angular velocity of the rotatable platform and the linear velocity of the detection apparatus are adjusted over time so that the velocity of the detection apparatus along a curved trajectory remains constant.

The data analyser 350 may include a storage medium, and a processor configured to execute instructions for carrying out processing of the data. The instructions may be downloaded or installed from a computer-readable medium which is provided for implementing data analysis according to the disclosure.

The processor may be configured to receive a first data set from the absorption sensor 140 to form an absorption image and a second data set from the energy resolving detector 160 to form a diffraction/scattering image.

The processor is configured to execute a correction algorithm to correct the angular dependency of the data collected by the absorption sensor and the energy resolving detector, respectively. For instance, the processor may be configured to process the first data set to correct for the angular dependency of each absorption detector of the absorption sensor 140. Similarly, the processor may be configured to process the second data set to correct for the angular dependency of each pixel of the energy resolving detector 160.

The processor may also be configured to perform various steps to obtain an absorption image and a diffraction/scattering image that overlap spatially. The absorption and diffracted signals from any point in space are preferably measured simultaneously but could also be measured at different point in time. The method for reconstructing the absorption images and the diffraction/scattering images in each respective space is different.

The absorption signal is used to perform tomosynthesis. The processor is configured to execute a tomosynthesis reconstruction algorithm to obtain the absorption images. Images from different depth planes are obtained by, for instance, shifting and adding the same absorption signals. The shift amount determines which depth plane is in-focus and which alternate depth planes (above or below) are out of focus or blurred. There is no magnification in this approach.

A scattering/diffraction image may be produced based on linear discriminant analysis (LDA) in which the spectra for each pixel of the energy resolving detector 160 is multiplied by a weighting per energy before being summed. The weightings per energy can be calculated such that they accentuate the object of interest compared to its neighbours. The energy at each pixel could also be integrated to provide total scattering/diffraction. Scattering/diffraction images may also be obtained for a specific energy range. For instance, a 2D image may be obtained showing only photons having an energy between 100-110 keV. Each photon detected is isomorphic in that it can only come from one place in 3D space. There is also no magnification in this approach. Co-registration is achieved by selecting an absorption image from a depth plane and overlaying it with the diffracted/scattered image from the same depth plane.

The processor may execute a segmentation algorithm to perform image segmentation of the absorption image to identify one or more regions of interest. Then a classification algorithm may be executed to perform image classification of the regions of interest identified using the scattering/diffracted information. Image classification may also be performed on the absorption image. If two touching objects share the same absorption signal, then these cannot be segmented only using the absorption signal. By using both absorption and scattering/diffraction data segmentation and classification can be improved.

For example, the processor may be configured to execute an algorithm to calculate a parameter of the sample which may be used to identify the sample. For instance, the parameter may be a lattice spacing (d-spacing) of the sample. Classification may then be performed using a set of rules. Alternatively, specific materials may be classified as targets. For instance, a library of target materials may be used that lists d-values for each target of interest. Sample identification may then be communicated to a third party by a suitable display or other type of indicia such as an audible or visible alarm signal. The processor may be provided in a remote server in communication with the detection apparatus.

A benefit of the proposed system is the precision with which scattering/diffracting signals can be integrated. If the object of interest were for instance partially occluded by an interfering object or sandwiched within another object (for example a laptop); then the integrity of the scattered/diffracting photons collected would be diminished. The co-registered nature of the images means that scattered/diffracted signals can be chosen from only the object of interest (isolating and removing pixels that intersect the interfering object) or parts of the objects that have suffered the least interference (i.e., the parts not obscured by the metal parts of a laptop). By collecting both absorption and scattering/diffracting signals using a common probe beam and detection system and by combining information derived from the absorption signal and the scattering/diffracting signal, the proposed system permits to reduce the probability of false alarms without unduly increasing the complexity of the system.

The screening system 300 may be used as a self-screening system. For instance, in an airport a passenger may load some luggage on the platform, wait for the scan to take place and receive a signal to go through a gate or alternatively an alarm may be raised if an item of interest has been identified.

The screening system 300 could also be used as a mail screening platform for identifying unauthorised objects, hazardous chemicals or other materials that may be included in letters or parcels.

Figure 4A:
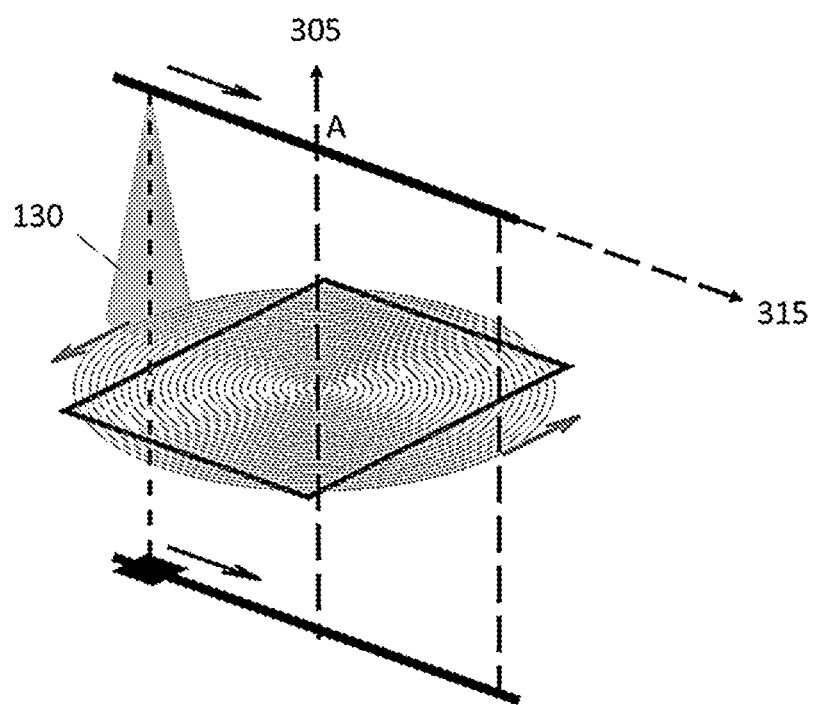
FIG. 4A is a diagram illustrating the scanning motion or scanning path of the screening system of FIG. 3.
Figure 4B:
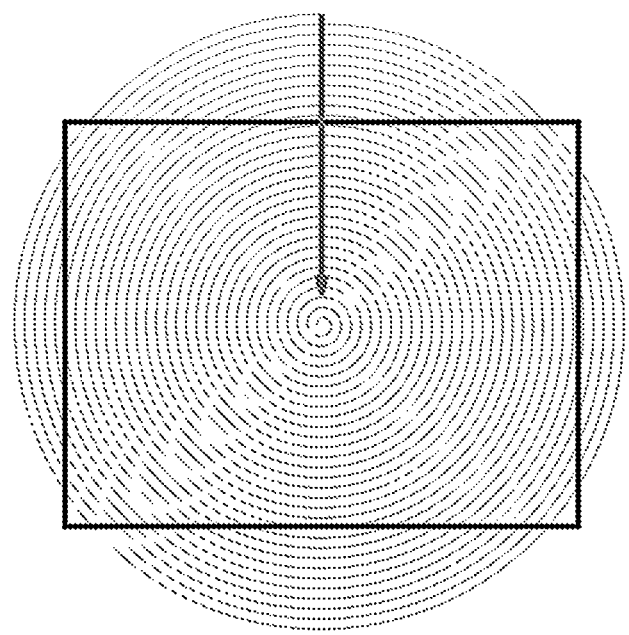
FIG. 4B is a top view of the diagram of FIG. 4A.

FIG. 4A is a diagram illustrating the scanning motion or scanning path of the screening system of FIG. 3 in the reference frame of the platform. FIG. 4B is a top view of the diagram of FIG. 4A.

The linear motion of the emitter portion/detector portion assembly 100 combined with the rotational motion of the platform 310 produces a planar curved trajectory that forms a spiral.

With each revolution of the platform 310, $(\theta-\theta_0)=n2\pi$, the detection apparatus 100 will have travelled a distance r from its position at $(\theta-\theta_0)=(n-1)2\pi$. This distance travelled with each full revolution is called the pitch (P). The velocity of the apparatus 100 referred to as linear probe velocity, $$\frac{\partial r_p}{\partial t},$$

is related to the pitch and angular velocity, ω by the following system of equations:

$$\frac{\partial r_p}{\partial t} = \left(\frac{\partial r_p}{\partial \theta_p}\right)\left(\frac{\partial \theta_p}{\partial t}\right)$$

$$\frac{\partial r_p}{\partial t} = \left(\frac{P}{2\pi}\right)\omega(t)$$

The screening system 300 may operate in different modes. In a first mode, referred to as Constant Angular Velocity (CAV) mode, the rotating platform rotates with constant frequency and the apparatus 100 is translated with a linear velocity that also remains constant. In a second mode referred to as constant spiral velocity (constant Linear velocity in the spiral coordinate system), the angular velocity of the rotating platform 310 and the linear velocity of the apparatus 100 change over time, so that the velocity of the probe 130 along the spiral trajectory remains constant.

At time t, the position of the centre of the primary beam 130 (probe), in the reference frame of the rotating platform, is described by co-ordinates relative to the system Centre of Rotation (CoR), in the plane of rotation, $(r_p(t),\theta_p(t))$. The cartesian co-ordinates of the centre of the probe are given by:

$$x_p(t)=r_p(t)\cos(\theta_p(t))$$

$$y_p(t)=r_p(t)\sin(\theta_p(t))$$

These co-ordinates describe the evolution of the spiral path as a function of time (See FIG. 4B). The reconstructed detector image is generated by combination of detector images at all time steps.

The number of rotations required for a full scan is defined by the distance between the starting position of the probe beam 130 at its extreme radial position and the centre of the platform 310 (plus an offset distance from the centre to take into account the fact that the probe does not have to go all the way to the centre to achieve full coverage) divided by the pitch distance P. For example, to scan a 300 mm radius disc with a 12 mm pitch, stopping at a radius of 12 mm from the centre of 310 would require 24 rotations.

Figure 5:
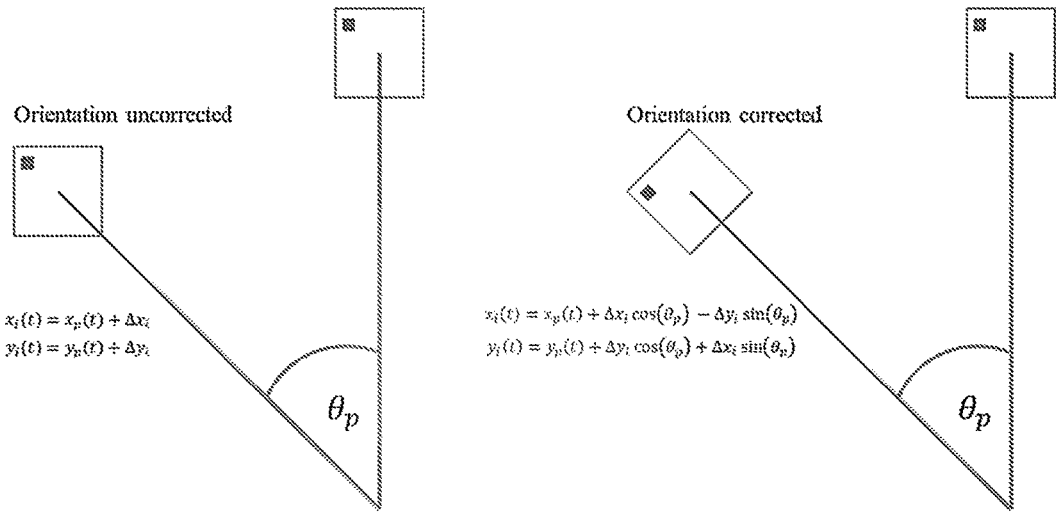
FIG. 5 is a diagram illustrating the position of a pixel of an energy resolving detector with and without orientation correction.

FIG. 5 illustrates the position of a pixel of the energy detector with and without orientation correction. As described above, the energy resolving detector 160 may be a pixelated detector having an array of pixels. The position of each pixel at time t, can be orientation-corrected by a rotation about the centre-point of the detector. The correction angle is equal to the rotation angle $\theta_p$ of the rotating platform 310 at time t such that the two-dimensional cartesian co-ordinates of the $i^{th}$ pixel, in the stationary reconstruction reference frame, are:

$$x_i(t)=x_p(t)+\Delta x_i \cos(\theta_p(t))-\Delta y_i \sin(\theta_p(t))$$

$$y_i(t)=y_p(t)+\Delta y \cos(\theta_p(t))+\Delta x_i \sin(\theta_p(t))$$

where $\Delta x_i$ and $\Delta y_i$ are the orthogonal cartesian vectors of the $i^{th}$ pixel in the detector array relative to the centre-point of the detector array in the rotating platform reference from $\theta_p=0$.

This orientation correction method can also be used to correct data collected by absorption sensor 140.

The scanning motion of a traditional raster scan is inefficient in that a significant amount of time is dedicated to accelerating and decelerating the probe. The proposed scanning motion of the disclosure is significantly more efficient than raster-scanning and permits the scanning of an entire security screening tray faster than a comparable traditional raster scan for a similarly sized object/tray.

Figure 6:
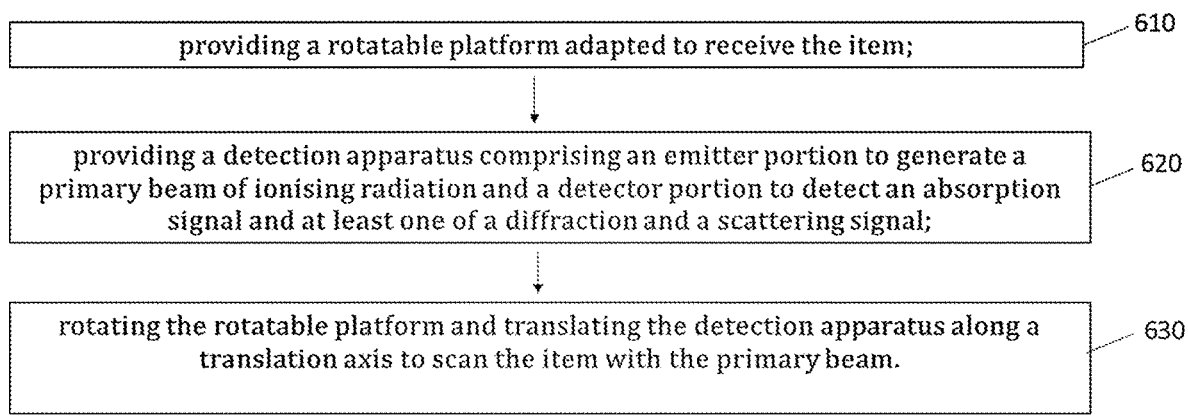
FIG. 6 is a flow chart of a method for screening an item.

FIG. 6 is a flow chart of a method for screening an item. At step 610 a rotatable platform adapted to receive the item is provided. At step 620 a detection apparatus is provided. The detection apparatus has an emitter portion to generate a primary beam of ionising radiation and a detector portion to detect an absorption signal and at least one of a diffraction and a scattering signal. At step 630 the rotatable platform is rotated, and the detection apparatus translated along a translation axis to scan the item with the primary beam.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A screening system for screening an item, the screening system comprising:

a detection apparatus comprising an emitter portion to generate a primary beam of ionising radiation and a detector portion to detect an absorption signal and at least one of a diffraction signal and a scattering signal; wherein the primary beam is a conical shell beam of ionising radiation; the screening system further comprising a rotatable platform adapted to receive the item; and a mechanical arrangement adapted to translate the detection apparatus along a translation axis to scan the item with the primary beam;

wherein the translation axis is substantially parallel to a surface of the rotatable platform;

wherein the rotatable platform is rotatable around a rotational axis;

wherein the primary beam has a characteristic propagation axis; and wherein the rotational axis is substantially parallel to the characteristic propagation axis.

2. The screening system as claimed in claim 1, wherein upon rotation of the rotatable platform and translation of the detection apparatus, the detection apparatus collects data along a curved trajectory in a reference frame of the rotational platform.

3. The screening system as claimed in claim 1, wherein the translation axis is substantially perpendicular to the rotational axis and intersects with the rotational axis.

4. The screening system as claimed in claim 1, wherein the emitter portion comprises a source of ionizing radiation and a beam former adapted to generate the primary beam of ionizing radiation.

5. The screening system as claimed in claim 4, wherein the source of ionizing radiation is a polychromatic source.

6. The screening system as claimed in claim 1, wherein the detector portion comprises an absorption sensor, an energy resolving detector and a collimator, the collimator comprising a plurality of channels, each channel being adapted to receive diffracted or scattered radiation.

7. The screening system as claimed in claim 6, wherein the collimator is provided along the characteristic propagation axis of the primary beam.

8. The screening system as claimed in claim 6, wherein the energy resolving detector is spatially resolved.

9. The screening system as claimed in claim 6, comprising a processor configured to receive a first data set from the detection apparatus to form a first image and a second data set from the detection apparatus to form a second image, wherein the first and second images overlap spatially.

10. The screening system as claimed in claim 9, wherein the first image is an absorption image and wherein the second image is a diffraction or a scattering image of the item.

11. The screening system as claimed in claim 10, wherein the energy resolving detector is a pixelated energy resolving detector and wherein the processor is configured to process the second data set to correct for the angular dependence of each pixel of the energy resolving detector.

12. The screening system as claimed in claim 10, wherein the absorption sensor comprises a plurality of absorption detectors elements and wherein the processor is configured to process the first data set to correct for the angular dependence of each absorption detector element.

13. The screening system as claimed in claim 9, wherein the processor is configured to execute a reconstruction algorithm to obtain a plurality of absorption images from different depth planes, to select an absorption image from one plane and to overlay the selected absorption image with a corresponding diffraction or scattering image from the same plane.

14. The screening system as claimed in claim 9, wherein the processor is configured to perform image segmentation of at least one of the first image and the second image to identify one or more regions of interest and to perform image classification of the said one or more regions of interest.

15. The screening system as claimed in claim 9, wherein the processor is configured to calculate a sample parameter based on the second set of data to identify the nature of a sample to be identified, wherein the sample parameter comprises a lattice spacing.

16. The screening system as claimed in claim 1, comprising a controller adapted to control the motion of the detection apparatus and of the rotatable platform.

17. A method for screening an item, the method comprising providing a rotatable platform adapted to receive the item, wherein the rotatable platform is rotatable around a rotational axis; providing a detection apparatus comprising an emitter portion to generate a primary beam of ionising radiation and a detector portion to detect an absorption signal and at least one of a diffraction and a scattering signal; rotating the rotatable platform and translating the detection apparatus along a translation axis to scan the item with the primary beam; wherein the translation axis is substantially parallel to a surface of the rotatable platform and wherein the primary beam is a conical shell beam of ionising radiation the primary beam having a characteristic propagation axis; and wherein the rotational axis is substantially parallel to the characteristic propagation axis.

18. The method as claimed in claim 17, comprising detecting the absorption signal and the said at least one of a diffraction signal and a scattering signal simultaneously.

* * * * *